United States Patent
Lehmann et al.

(10) Patent No.: US 8,518,314 B2
(45) Date of Patent: *Aug. 27, 2013

(54) METHOD OF FIXATION FOR A MECHANICAL DOWEL

(75) Inventors: Mario Lehmann, Les Pommerats (CH); Laurent Torriani, Lamboing (CH); Jorg Mayer, Niederlenz (DE); Marcel Aeschlimann, Ligerz (CH)

(73) Assignee: Woodwelding AG, Zug (CH)

( * ) Notice: Subject to any disclaimer, the term of this patent is extended or adjusted under 35 U.S.C. 154(b) by 221 days.

This patent is subject to a terminal disclaimer.

(21) Appl. No.: 12/739,563

(22) PCT Filed: Oct. 22, 2008

(86) PCT No.: PCT/CH2008/000441
§ 371 (c)(1),
(2), (4) Date: Nov. 26, 2010

(87) PCT Pub. No.: WO2009/052644
PCT Pub. Date: Apr. 30, 2009

(65) Prior Publication Data
US 2011/0062617 A1  Mar. 17, 2011

Related U.S. Application Data

(60) Provisional application No. 60/982,449, filed on Oct. 25, 2007.

(51) Int. Cl.
*B29C 65/08* (2006.01)
(52) U.S. Cl.
USPC ............................ 264/248; 264/263; 264/275

(58) Field of Classification Search
None
See application file for complete search history.

(56) References Cited

U.S. PATENT DOCUMENTS

| | | | |
|---|---|---|---|
| 4,100,954 A | | 7/1978 | Muller et al. |
| 4,257,839 A | * | 3/1981 | Yoshida et al. ............... 156/555 |
| 5,310,434 A | * | 5/1994 | Vives et al. ..................... 156/92 |
| 6,913,666 B1 | * | 7/2005 | Aeschlimann et al. ...... 156/73.1 |
| 7,160,405 B2 | | 1/2007 | Aeschlimann et al. |
| 7,765,672 B2 | * | 8/2010 | Clinch et al. .................... 29/520 |
| 7,815,409 B2 | | 10/2010 | Aeschlimann et al. |
| 7,950,129 B2 | * | 5/2011 | Clinch et al. ............... 29/525.01 |

(Continued)

FOREIGN PATENT DOCUMENTS

| WO | 98/00109 A1 | 1/1998 |
|---|---|---|
| WO | 98/42988 | 10/1998 |

(Continued)

*Primary Examiner* — Edmund H. Lee
(74) *Attorney, Agent, or Firm* — Rankin, Hill & Clark LLP

(57) ABSTRACT

An anchoring method of anchoring an anchoring element in a construction object is provided, where a surface of which object has at least one of pores in a surface, structures in a surface (such as an arrangement of ridges with undercut), a inhomogeneous characteristic with makes the penetration of a surface by a liquid under pressure possible, thereby creating pores filed by the liquid underneath the surface, and of a cavity. The method includes the steps of: providing a first element and a second element, the first element comprising a thermoplastic material; positioning the first element in a vicinity of said surface and/or of said cavity, respectively, and positioning the second element in contact with the first element; and causing a third element to vibrate while loading the first element with a force, thereby applying mechanical vibrations to the first element, and simultaneously loading the first element with a counter-force by the second element.

19 Claims, 12 Drawing Sheets

(56) References Cited

U.S. PATENT DOCUMENTS

| | | |
|---|---|---|
| 8,151,541 B2 * | 4/2012 | Aeschlimann et al. .... 52/745.21 |
| 8,225,479 B2 * | 7/2012 | Clinch et al. ............... 29/525.05 |
| 2004/0030341 A1 * | 2/2004 | Aeschlimann et al. ......... 606/72 |
| 2009/0018560 A1 * | 1/2009 | Mayer et al. .................. 606/151 |
| 2009/0131947 A1 * | 5/2009 | Aeschlimann et al. ......... 606/93 |

FOREIGN PATENT DOCUMENTS

| | | |
|---|---|---|
| WO | 00/79137 A1 | 12/2000 |
| WO | 2006/002569 A1 | 1/2006 |
| WO | 2008/034278 A1 | 3/2008 |

* cited by examiner

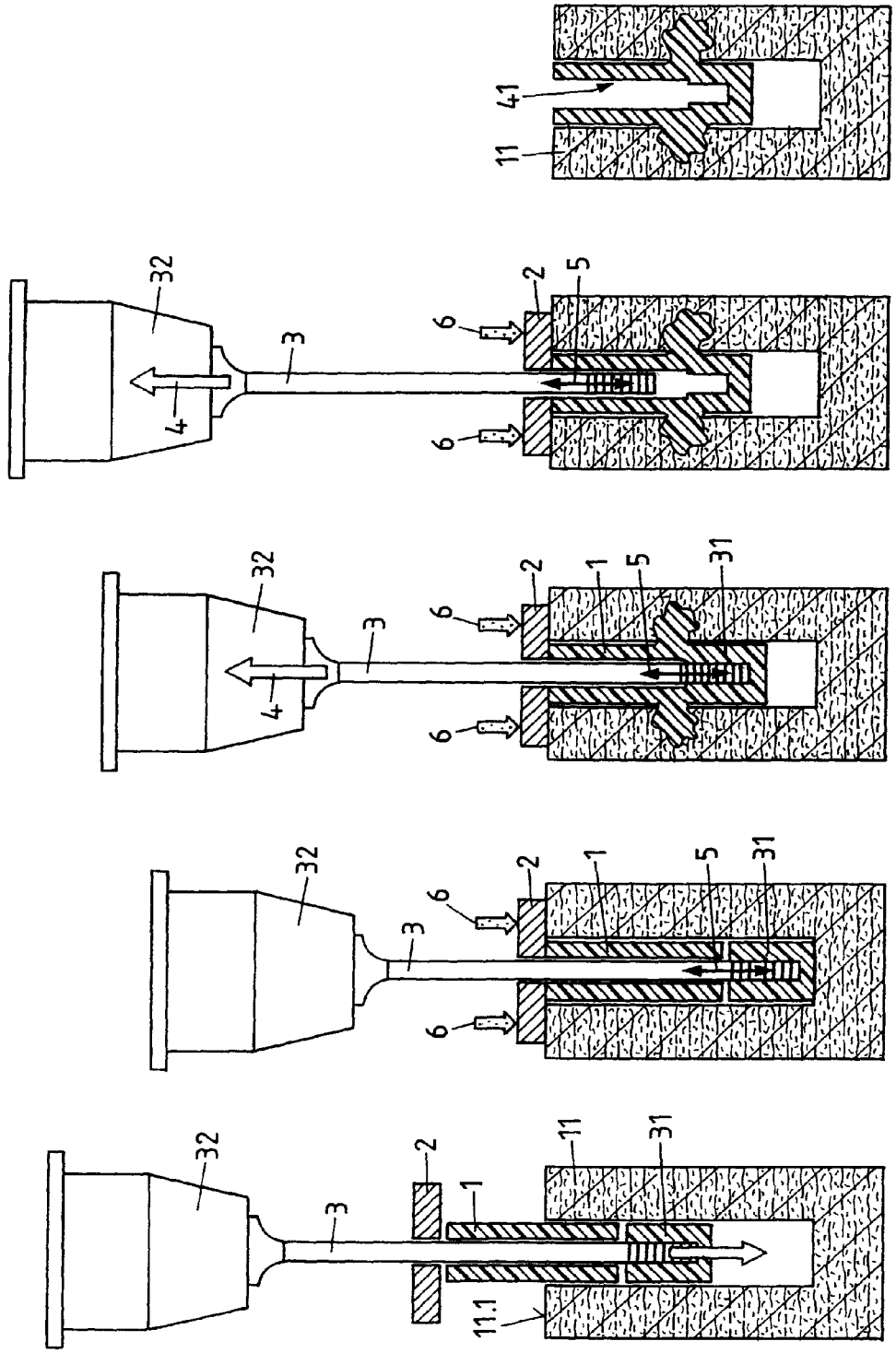

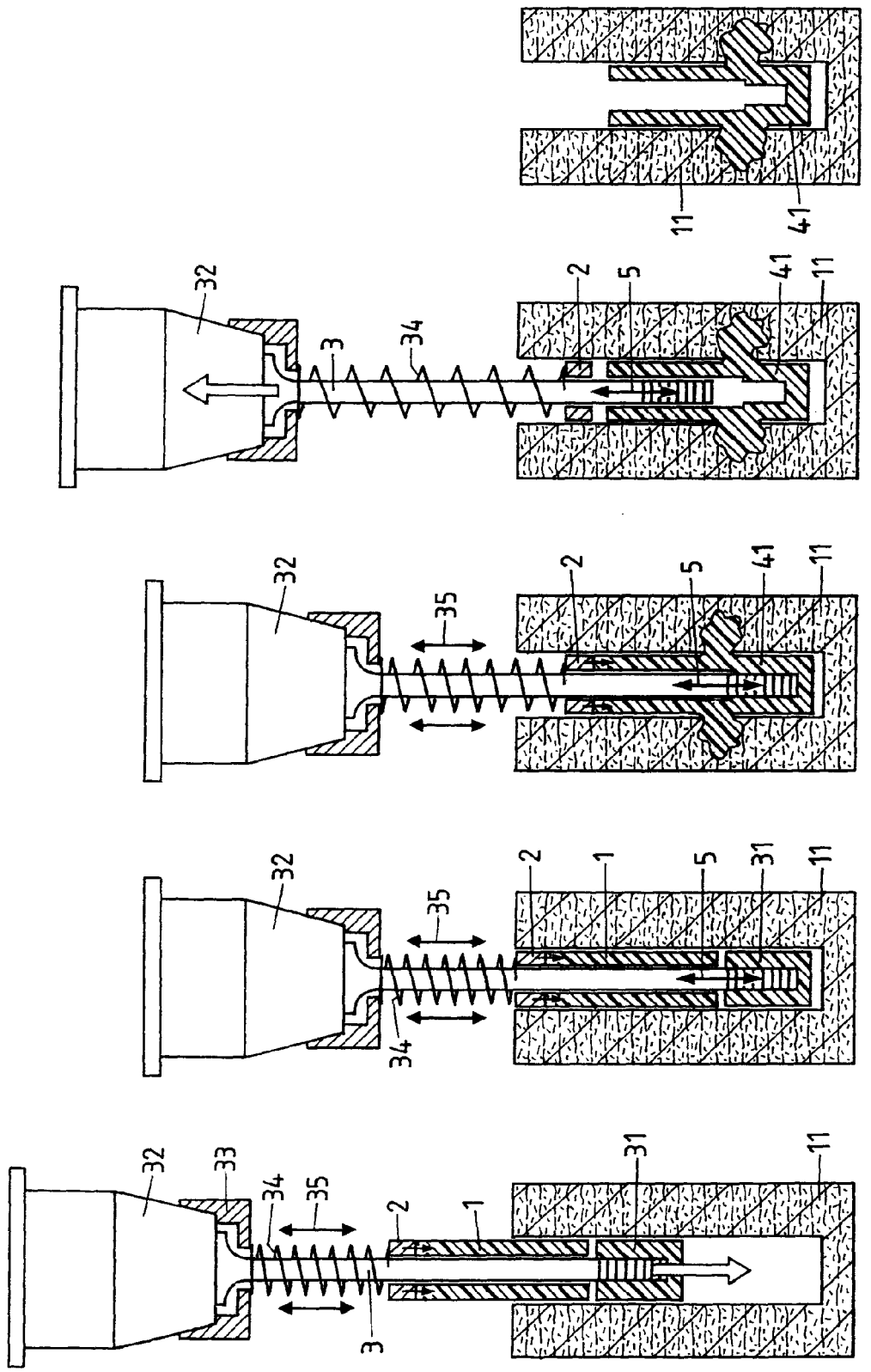

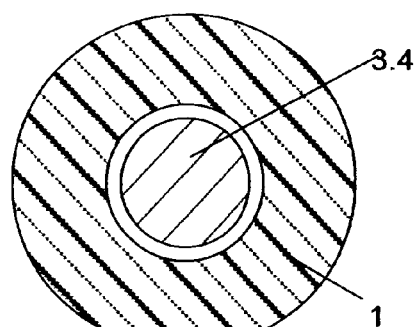 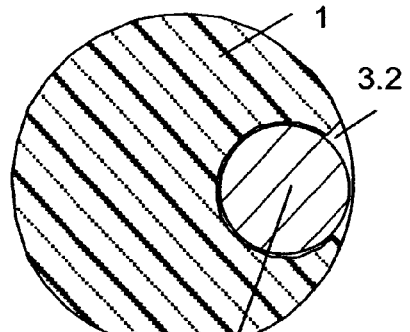
Fig. 13a  Fig. 13b
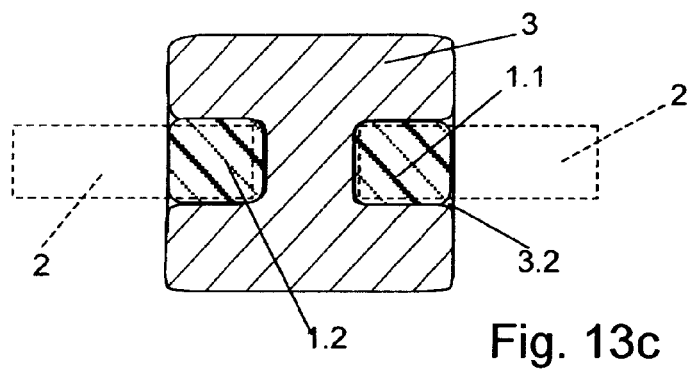
Fig. 13c
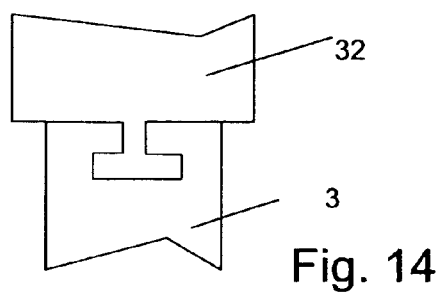
Fig. 14

METHOD OF FIXATION FOR A MECHANICAL DOWEL

FIELD OF THE INVENTION

The invention is in the field of construction, especially building industry, timber construction, furniture industry and mechanical construction and concerns a method of anchoring an anchoring element (such as for example a dowel) in a construction object comprising construction material. The invention also concerns a corresponding device.

BACKGROUND OF THE INVENTION

Methods of anchoring connecting elements in an opening in a fibrous or porous building material with the aid of mechanical vibrations are known from publications such as WO 98/00109, WO 00/79137 and WO 2006/002569, and for example from the international patent application PCT/CH 2007/000460. According to these methods a connecting element is placed in a prefabricated opening of the object or pressed against the surface of the object by a directed force, which in turn creates an opening. While a force acts upon the connecting element in the direction of an axis of the opening the element is excited by mechanical vibrations. The connecting element comprises thermoplastic material at least on one surface, which comes into contact with the material of the object during this procedure. The energy of the mechanical vibrations is set to liquefy thermoplastic material in the area of a predetermined anchoring point by mechanical vibrations and to press it into the pores or surface structures of the object by pressure building up at the anchoring point between a wall of the opening and the connecting element, thus forming a most effective macroscopic anchoring.

SUMMARY OF THE INVENTION

It is an object of the present invention to provide an improved method of anchoring an anchoring element. The term "anchoring element" used in this text refers to any element that is suitable of being anchored and forming or being part of, after anchoring, an anchor. Such anchors include but are not restricted to connecting elements, such as a dowels, rivets, nails, etc. or any other piece to be anchored directly in the object. Anchors in this sense are suitable of attaching a further part to the construction object, or they may in themselves have a function, for example for decoration.

It is a further object of the invention to provide an anchoring method suitable of automation, where possibly the working parameters (forces, energies etc.) can be pre-defined.

It is yet a further object of the invention to provide an improved anchoring device.

The construction object, in which the anchoring element may be anchored, may as a first option have a porous or structured surface or surface in which pores can be generated by a liquid under hydrostatic pressure. The object may then be of wood, a wood composite (such as chipboard, particle board, oriented strand board etc), cardboard, concrete, brick, plaster, stone (such as sandstone) or industrial hard foam, into which a liquefied material can penetrate under pressure, or a composite of any combination of the mentioned materials. As a second option, the object may have a cavity into which liquefied material can get during the anchoring process to thereby anchor the anchoring element. According to this second option, a material of the construction object may be of any one of the materials mentioned for the first option, or of any other construction/engineering material, including, but not limited to, metals, such as steel, aluminum etc. The object may correspond to both, the first and the second option.

According to the invention, therefore, an anchoring method of anchoring an anchoring element in a construction object is provided, where a surface of which object has at least one of:

pores in a surface structures in a surf ace (such as an arrangement of ridges with undercut)

a inhomogeneous characteristic with makes the penetration of a surface by a liquid under pressure possible, thereby creating pores filled by the liquid underneath the surface (the creation of pores in hard material such as wood is caused by the local breaking of connections, such as between wood fibres, whereas the creation of pores in softer material such as core material ('isolation material', etc. may be due to the local displacement and/or compression of the softer material); and a cavity;

the method comprising the steps of providing a first element and a second element, the first element comprising a thermoplastic material;

positioning the first element in a vicinity of said surface and/or of said cavity, respectively, and positioning the second element in contact with the first element;

causing a third element to vibrate while loading the first element with a force, thereby applying mechanical vibrations to the first element, and simultaneously loading the first element with a counter-force by the second element;

by the joint application of the mechanical vibrations and the load, liquefying at least some of the thermoplastic material at at least one interface, thereby creating liquefied material, wherein said at least one interface is at least one of an interface between the first element and the third element, of an interface between the first element and the second element, and of an interface between parts of the first element;

causing, by the joint application of the mechanical vibrations and the load from by the second and third element, the first element to be compressed and thereby causing the liquefied material to flow into pores and/or structures and/or the cavity; and letting the liquefied material re-solidify so that the first element is anchored in the object.

The first element comprises the thermoplastic material and is compressed during anchoring while at least some of the thermoplastic material is liquefied. Usually, by the compression between the force and the counter force, the liquefied material is caused to flow sideways with respect to an axis defined by the force, i.e. at least partially into lateral directions. For example, the liquefied material may be caused to flow in all lateral directions to substantially form a ring surrounding the initial position of the anchoring element.

The compression of the first element in the method according to the invention is made possible by the liquefaction of thermoplastic material, and the compression causes the liquefied material to evade (usually sideways) into the structures/pores/cavity. The first element in its solid state need not be compressible (and preferably is not compressible) along the axis defined by the bore or opening direction. This is in contrast to the teaching of PCT/CH 2007/000460, where liquefaction is based on contact with the material surface, which contact is caused by a compression that causes a lateral distance of an outermost surface to the axis to be increased, in the solid state. Preferably, the anchoring element does, in its solid state, does not exhibit any substantial compression under 'normal' conditions (i.e. when forces of the magnitudes used during anchoring impinge at atmospheric conditions). This means for example, that a small residual compression (any element has some elasticity and is in theory, to some very small extent, compressible) is essentially angle preserving (deforms the anchoring element in a conformal manner), the angle deformations for example not exceeding 3°, and the compression under normal circumstances does not exceed 3%.

The first element is also denoted anchoring element in this text. This does not imply that the anchor necessarily consists of the anchoring element only; the anchor may comprise further elements, including, optionally, the third and/or the second element.

The second element may be any dimensionally stable element suitable of applying a counter force to the first element. It may be of one piece or it may comprise a plurality of parts connected to each other or resting against each other during the anchoring process. The second element may be of a material not liquefiable by the mechanical vibrations—such as metal, a thermosetting plastics or a thermoplastic material with a substantially higher glass transition temperature than the thermoplastic material of the first element. As an alternative, the second element may comprise liquefiable material (however, in most cases liquefaction of such material will only occur indirectly by heat or vibration transmission through the first element, the second element preferably being vibratory decoupled from the third element with the exception of the path through the first element).

Whereas in most preferred embodiments, the second element will be held still (and only vibrate by weakly being vibratory coupled to the third element through the first element), this need not be the case. Rather, the second element may also be actively caused to vibrate, the vibrations being different from the vibrations of the third element (and for example of opposite or different phase and/or a different frequency etc.)

The third element as a whole is suitable of transmitting the mechanical vibrations from a mechanical vibration generator (that may include a piezoelectric transducer; more in general mechanical vibration generators are known in the art and will not be described in any more detail here) to a contact face with the first element. To this end, the third element is preferably designed so that at the vibrating frequency, it oscillates so that the interface where the vibrations are to be coupled into the first element should be at a place of maximum amplitude or close thereto. If, for example the third element is of one piece of material and has a substantially constant cross section, the vibrations are longitudinal vibrations, and the wavelength of the vibrations of the vibration frequency is $\lambda$, the length of the third element is preferably approximately $n*\lambda/2$, where n is any natural number.

The third element may be a one-piece element or comprise a plurality of pieces that are rigidly fixed to each other (e.g. by a positive-fit connection such as screwing, by welding, or by gluing).

The vibrations in the third element may be longitudinal vibrations, transversal vibrations, torsional vibrations, other kinds of vibrations, or combinations (superpositions) of different vibration modes.

In contrast to the methods described in WO 98/00109, WO 00/79137 and WO 2006/002569, and in the international patent application PCT/CH 2007/000460, the method according to the invention is based on a liquefaction of the thermoplastic material by way of (external or internal) friction forces at at least one interface between the first, second and/or third element (or parts thereof) an/or at at least one interface within the first element. This leads away from the state-of-the art concept of liquefying the thermoplastic material by friction between the anchoring element and the object surface. Instead, the material is liquefied at interfaces between initially separate (or only weakly coupled) elements or within the elements themselves. In other words, the elements involved in the method are arranged in a manner that the thermoplastic material would melt even in the absence of the object in which the anchoring element has to be anchored, purely by the joint action of the forces applied to the first element through the second and third element and the mechanical vibrations. This makes the application of the necessary forces in a pre-defined manner possible. Automation of the process as a consequence is possible more easily, for example by having the necessary forces applied within a load frame and without external forces onto said load frame.

The melted thermoplastic material is then caused to flow into pores/structures and/or at least one cavity. This may necessitate hydrostatic pressure to build up (due to the effect of the compression of the anchoring element). However, almost no or only little hydrostatic pressure is necessary in case the object is already porous or in case it is (locally) of a weak material. As a consequence precisely in the cases where the object could easily be damaged by the impact of forces acting on it, the possibly only impact on the material is a very small hydrostatic pressure.

For an anchoring element of constant (as a function of the position along the axis) cross section, the interface to the vibrating third element is automatically the default place for the liquefying to start, and this is desired in many embodiments of the invention. However, the anchoring element may also—deviating from the constant cross section—comprise an energy director (energy concentrator) or a plurality of energy directors to ensure that the liquefaction takes place at the desired location.

Such energy directors may be structural energy directors, such as at least one of
  a reduction of a cross section as a function of the position along an axis, towards the interface where liquefaction is desired,
  at least one protrusion within a broad ranges of diameters, the protrusion being at the interface where liquefaction is desired,
Energy directors may, however, in addition or as an alternative, also be due to material properties. They thus may comprise:
  an inhomogeneous material distribution over the anchoring element (and/or the second and/or the third element), so that the material adjacent the interface where liquefaction is desired has a higher absorption for mechanical vibration energy than material adjacent an other interface (for example the opposite interface). For example the anchoring element may comprise two parts adhering to each other, the part adjacent the interface to the third element being softer than the part adjacent the interface to the second element (or vice versa). As an other example, the anchoring element may comprise a softener with a concentration gradient over the anchoring element's length, etc.

The anchoring element may for example comprise a first and a second coupling face, different from the first coupling face, where the force is caused to impinge on the anchoring element by pressing the third element against the first coupling face, and where the counter-force is caused to impinge on the anchoring element by pressing the second element against the second coupling face.

The coupling faces may for example be on opposite sides of the anchoring element. They may be substantially perpendicular to or at an angle to the axis defined by the direction of the force. They can optionally be substantially parallel to each other.

The force and the counter force are preferably equal in magnitude but have opposite directions. This condition, however, has to be fulfilled only approximately, as the anchoring element may for example contact, during anchoring, a sidewall of the object and thereby absorb a further force compensating for minor inequalities of magnitude and/or direction of the force and counter force.

The force and the counter force, however, are such that during anchoring the surface comprising the pores/structures/inhomogeneous characteristic/cavity does not need to be mechanically loaded. All processes leading to the liquefaction of at least a part of the thermoplastic material and to the pressing out of the liquefied materials (that will then be caused to flow into pores or structures or the cavity) are independent of the object in which the anchoring element is anchored. As mentioned, the liquefaction of the thermoplastic material would also work absent the object—even in vacuum or under water.

Whereas this liquefaction independent of a contact to the construction object is, according to the invention, the predominant liquefaction mechanism, this does not exclude additional melting by friction between the anchoring element and the object.

The approach according to the invention has major advantages:

Suitability for automation: Since the necessary parameters for a given assembly of the first, second and third element are known, the required forces may be applied automatically, and even with an apparatus for which no feedback on resistance forces etc. is available. The geometrical details of the construction object are irrelevant. The material properties of the construction object are only relevant to the extent that the hydrostatic pressure used for causing the liquefied material to flow into pores may depend on the material properties. This may be taken care of by providing the possibility of applying material dependent forces (that can easily be chosen between), or by ensuring that the force and counter force are in any case sufficient also for interpenetration of comparably hard structures.

Independence from the geometry of the construction object: The parameters (forces to be applied; vibration energies etc.) only depend on the elements used and not on the construction object.

Independence from the construction material quality: Since no friction is required between the thermoplastic material to be liquefied and the object in which the anchoring element is anchored, the anchoring may take place also in material that is very weak and/or brittle, such as highly porous material (plasterboard, cardboard, low quality wood composites, diluted foams etc.).

New degrees of freedom concerning materials: Due to the approach according to the invention, it is not necessary any more to transport vibration energy through the thermoplastic material from a coupling-in face to a place where the thermoplastic material is in contact with the object it is anchored in. Rather, the liquefaction may take place directly at the interface between the first and third elements, within the first element (due to internal friction) or at other interfaces. Due to this, the vibration energy transportation capabilities of the thermoplastic material are less important than in prior art methods, and consequently the skilled person, if confronted with a specific task, can choose between more materials.

Automated anchoring may for example be useful in a manufacturing line of furniture or of pre-fabricated building elements or other objects. It may also be used in a handheld device, for example to be utilized by a professional or do-it-yourselfer in building. Depending on the implementation, an automated device does not need to be pressed against the object any more, but all forces may be created within a load frame of the automated device. If many anchors are set, the process is thus less exhausting for the user. Also, the anchoring will be successful independent of the knowledge the user has of the object and of the user's skills.

A preferred variant of any one of the herein described embodiments, therefore, features the step of automatically applying, by means of a spring element, a hydraulic or pneumatic element or an other suitable mechanism, the force acting on the anchoring element during anchoring. For example, the spring element/hydraulic element/pneumatic element may be arranged so as to exert a well-defined force between a non-vibrating part of the vibration generator (and thus indirectly the third element) and the counter element.

Preferably, the anchoring element is anchored in a pre-fabricated opening (blind hole or through hole). The flowing of the liquefied material into lateral directions may then cause the liquefied material to penetrate pores and/or structures of the lateral side walls of the opening. In addition or as an alternative, the anchoring takes place by means of a cavity behind (on the rear side of) a pre-fabricated bore. Such a cavity may have an unlimited width or a larger diameter than the pre-fabricated bore, measured perpendicularly to the axis.

"Pre-fabricated" does not imply that a bore necessarily has to be made for the purpose of the anchoring only; rather, any already present opening or space may be used for anchoring also.

In this text, the orientation of the elements is sometimes described referring to an axis, which axis ("anchoring axis") is defined by the direction of the forces applied during the anchoring process. In the embodiment, in which the anchoring element is anchored in a pre-fabricated bore, the axis is often coaxial with an axis of the bore. Often, the person or apparatus carrying out the method according to the invention has or needs access to the element to be anchored and the tools from one side only (often, for example, if the anchoring element serves as a "dowel" or fastening nail or fastening screw). The side from which the person or apparatus carrying out the method accesses the tool(s)—the "front" side—is referred to as the "fore" side, whereas the opposite side of the elements—the side protruding the deepest into the object or reaching the rear side—is termed the "rear" side in this text. The "forward" direction regarding the driving an element into the construction object is the direction away from the user or apparatus (the "ordinary" direction for example for driving a nail or dowel into an object) and "backward" denotes the opposite direction towards the user.

According to a special preferred principle, the force is coupled into the third element—that may be a sonotrode—as a pulling (tensile force). According to this special preferred embodiment of the invention, the mechanical vibrations may be coupled into the first element (anchoring element) from the rear side. This means that the third element—that may for example be a sonotrode of a vibration generating device—reaches through the first element and accesses the first element from behind, so that the first coupling face of the first element is in contact with a coupling section of the third element.

This special preferred principle features substantial advantages over the prior art. In the anchoring method according to the state of the art as for example disclosed in WO 98/00109, the mechanical vibration energy used for melting the thermoplastic material is applied from the fore side and has to be transferred through the anchoring element to the rear side, where the material is to melt in contact with the construction material and to anchor therein. This can cause problems in connection with the coupling of the sonotrode to the anchoring element, as the fore end of the anchoring element may be activated, and the vibration energy is absorbed at the fore end instead of being transferred to the rear end ("head melting" of the anchoring element). The overcoming of this effect necessitates, among other things, the force between the sonotrode and the anchoring element to be comparably large, so that the connection between them is strong. The approach according to the special embodiment of the invention, in contrast, transfers the mechanical vibration energy to the rear end of the anchoring element—where the latter is supposed to melt—directly by the not liquefiable third element (the "sonotrode"/ the "tool"), and the "head melting" effect is utilized. Also, the melting of the thermoplastic material occurs at the desired places without the need of a strong force to be applied.

In order to be able to access the anchoring element from the rear side, the sonotrode is usually long and narrow enough to reach through the anchoring element—or alongside it—to its rear end. Preferably the anchoring element is hollow (thus for example tube shaped or sleeve shaped), a shaft of the sonotrode reaching through the axial through hole of the anchoring element. The anchoring element can be one part or comprise a plurality of parts, each having an axial through opening.

If the anchoring element (consisting of one piece or of several parts) has an axial through opening through which a shaft of the sonotrode reaches, the sonotrode—or a part attached to it for transferring the mechanical vibrations—has to have a rear broadening so that an outward-facing outcoupling face is formed, the outcoupling face to be brought in contact with the first coupling face of the anchoring element. After anchoring, however, such a rear broadening cannot be removed to the fore side any more, because of the anchoring element. Therefore, there are the following basic possibilities to proceed.

The rear broadening together with the shaft remains in place after anchoring and forms part of the anchor. For example, the rear broadening and the shaft may be one-piece (and for example metallic) and together form the sonotrode. This possibility is especially advantageous if the shaft is to be used to attach a further element. To this end, the shaft may optionally comprise structures such as a threading or elements of an other kind of fitting.

The rear broadening and the shaft may be separated from each other after anchoring. In this case, the rear broadening is formed by a base element, preferably of a different material than the shaft. For example, the rear broadening may be made of a thermoplastic material fit to a rear end of the shaft, which shaft may for example be metallic. The thermoplastic material may be the same as the one of the anchoring element, or it may be different. Due to a softening or melting of the thermoplastic material during or after the anchoring process, the shaft may be retracted. In accordance with this second possibility, the base element may be welded to the anchoring element during anchoring and forms part of the anchor after anchoring. As an alternative, the shaft and the base element may both be made of material that does not melt under the anchoring conditions (for example, they both may be made of a same material), and may be connected together with a mechanical locking (such as a threaded connection or a bayonet fixing) that may be released after anchoring.

The sonotrode can be removed towards the rear side. For practical reasons, this is most often not an option, however.

In embodiments according to the special preferred principle, there are different possibilities of compressing the anchoring element between the two coupling faces. If the anchoring element comprises two coupling faces on opposite sides thereof, the most general description is that the second and third element are moved relative to each other so that the anchoring element is compressed between the coupling faces (the coupling faces approach each other).

According to a first variant, the second element (often named "counter element" in this text) is kept still relative to the construction object. The second element may for example comprise a surface portion resting against a front surface of the construction object. The third element (the sonotrode, possibly including an element connected to the sonotrode) is then pulled towards the front side to compress the anchoring element.

According to a second variant, the third, vibrating element is kept at a fixed position, and the second element is pushed towards the rear side to compress the anchoring element. This second variant is especially advantageous in cases where the depth of the opening in the construction object is limited. For example, the anchoring element may initially be longer than the depth of the opening.

The force by an element kept at a fixed position does not produce any work in the physical sense. It thus does not need not be an active force but can be caused by the respective element—or a part affixed to it—is merely supported by a dimensionally stiff item that is not movable relative to the object—such as a foremost surface of the object itself. In the case of the second variant, of course, it is not the third element itself element that is supported by the unmovable item but a non-vibrating casing of the vibration generator, or a non-vibrating part affixed to the vibration generator.

Also hybrids between the first and second variant are possible, i.e. methods in which both, the second and the third element are moved relative to the construction object.

According to an alternative to the "tensile force" or "rearward" principle, in a different embodiment of the invention, the mechanical vibrations are applied, conventionally, from the fore side, whereas the counter force is applied from the rear side by the second element. The second element can then be such that it reaches to the front object surface and can be held from there—either by propping on the object front surface or by the person or apparatus applying the method. This is preferred in situations, where the bore in the construction object is either a through bore or where the construction material at the base of the bore is relatively weak or brittle.

As an alternative for stronger construction objects, other embodiments of the "forward" anchoring principle may feature the counter element resting against the base of the bore during the anchoring process.

The counter element may for example be a receptacle formed by a sleeve with a plurality of holes and a receptacle mouth, the first element being placed within the receptacle. During liquefaction, the liquefied material is pressed through the openings and into pores, structures, and/or the cavity of the construction object. The counter element may comprise a flange protruding sideways in the region of the mouth, so that the counter element may prop on a stable front surface of the construction object. As an alternative, the sleeve may be anchored in a counter sunk manner, the sleeve resting against the base of the bore in the construction object during anchoring.

The embodiments where the counter element is a sleeve with a plurality of holes have the additional—sometimes advantageous—feature that the flow of the liquefied material is spatially restricted. It takes place only at characteristic outflow (opening) locations that moreover may remain at a fixed location during anchoring.

In this text "thermoplastic material" is used for describing a material comprising at least one thermoplastic component able to be liquefied by mechanical vibrations due to external and/or internal friction. The thermoplastic material makes up at least a part of the anchoring element; it may form the whole anchoring element. Besides thermoplastics the thermoplastic material can also comprise non-thermoplastic components, such as reinforcing fibers, reinforcing splints, filling materials etc. Non-thermoplastic components can be evenly distributed in the thermoplastic material or be present in varying concentrations. The anchoring element can further comprise areas free of thermoplastic material. Such areas may be of metal, glass, ceramic material, or of non-thermoplastic materials or thermoplastic material(s) liquefiable at substantially higher temperatures compared to the basic thermoplastic material.

The mechanical frequency of the mechanical vibrations—this too applies to all aspects of the invention described in this text—often lies between 2 kHz and 200 kHz and their amplitudes may be around 20 µm, i.e. between 1 µm and 100 µm—for special applications also higher or lower. If the thermoplastic material is to take over a load bearing function and is to liquefy only in the named contact areas, it ought to have a coefficient of elasticity of more than 0.5 GPa, preferably 1 GPa or higher. However, as mentioned elsewhere in this text, the invention makes possible that new classes of thermoplastic materials may be used for anchoring, including thermoplastic materials with a comparably low modulus of elasticity, in special applications even less than 1 GPa or less than 0.5 GPa.

Any thermoplastic material or combination of thermoplastic materials used in construction can be applied. Examples of thermoplastic materials include a wide variety of harder and softer polymer materials, including their copolymers and their blends. In fact, almost any polymer that can be injection molded may be used. A table of suitable materials can for example be found in "Plastics and Composites Welding Handbook"; Grewell D. A., Benatar A., Park J. B (eds.) Hanser Publishers, Munich, 2003, pp. 176-179.

The invention also concerns a device for producing an anchor in a construction material object. The device is preferably designed for carrying out the above-described method and comprises the elements mentioned in the description of the method. The device may for example comprise an anchoring element comprising thermoplastic material and comprising a first and a second coupling face,
a counter element comprising a counter element coupling face,
and a third element, the third element being suitable of being coupled to a generator of mechanical vibrations and of transferring the mechanical vibrations to an outcoupling face of the third element,
the anchoring element, the counter element and the third element adapted to be assembled so that:
the outcoupling face of the third element abuts the first coupling face; and
the counter element coupling face abuts the second coupling face, and
a compressing force can be applied onto the anchoring element by loading the third element and the counter element with a force and a counter force, respectively, of equal magnitude and opposite directions;
wherein the directions of the force and the counter force are such that, with respect to an axis defined by the force and the counter force, a lateral outermost surface of the anchoring element in vicinity to an interface to the third element is formed by the thermoplastic material.

BRIEF DESCRIPTION OF THE DRAWINGS

In the following, embodiments of the invention are described in connection drawings. The drawings are schematical and not to scale. In the drawings, same reference numerals are used for same or equivalent elements. Therein:

FIGS. 5a-5e show method steps of an embodiment of the method according to the invention;

FIGS. 9a-9e illustrate method steps of a further embodiment of the method according to the invention;

FIGS. 13a-13c illustrate variants of anchoring elements and sonotrode shafts in section;

FIG. 14 shows a coupling suitable for transmission of a pulling force;

DESCRIPTION OF THE PREFERRED EMBODIMENTS

Figure 1A:
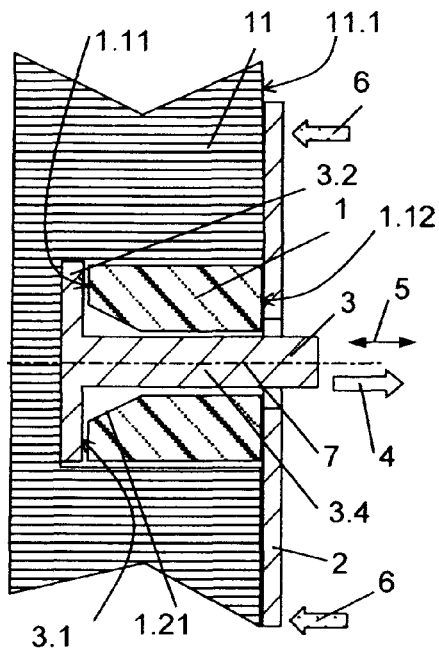
FIGS. 1a and 1b illustrate a first embodiment of the device and method according to the invention.

The first element (anchoring element 1) of FIG. 1a is formed by a sleeve of a thermoplastic material with a sleeve axis 7. The end faces of the anchoring element 1 define a first and a second coupling face 1.11, 1.12.

The anchoring element in the illustrated configuration is located in a bore of the construction object 11. With respect to an axial direction, it is sandwiched between a second element (counter element 2) and an outcoupling face 3.1 of a third element (tool 3). To this end, the tool 3 comprises a tool shaft 3.4 and a rear broadening 3.2 that in the illustrated version is disk-like and defines the forward facing outcoupling face 3.1.

In the anchoring process, a pulling force is applied onto the tool 3, and at the same time a counter force of the same magnitude but of an opposite direction is applied onto the counter element, so that the anchoring element 1 is compressed between the tool and the counter element. In the shown configuration, the counter element rests against the front surface 11.1 of the object 11, so that the force externally applied to the counter element 2 does not need to be precisely defined but can be larger than the pulling force, as the normal force from the object 11 onto the counter element 2 compensates a possible surplus of the external force and in this situation automatically adjusts the counter force to be equal in magnitude to the pulling force.

In this and the following figures, the force applied to the vibrating element (and from the vibrating element onto the anchoring element) is generally symbolised by an arrow 4, whereas the counter force being applied by the counter element is represented by a dotted arrow 6, irrespective of whether the respective force is a holding force (i.e. the element upon which it acts is held still by it) or whether it actually moves the element to compress the anchoring element. In fact, as illustrated further below, the force applied onto the tool, or the force applied onto the counter element, or both, the force on the tool and the force on the counter element may cause the respective element to move and thereby to compress the anchoring element between the tool and the counter element.

While the pulling force acts on the tool 3, mechanical vibrations—such as ultrasonic vibrations, the vibrating frequency for example being between 2 kHz and 200 kHz—act on the tool. Thereby, the thermoplastic material at first coupling face 1.11 starts melting. The anchoring element 1 towards its rear and comprises a taper 1.21 serving as energy director.

Figure 1B:
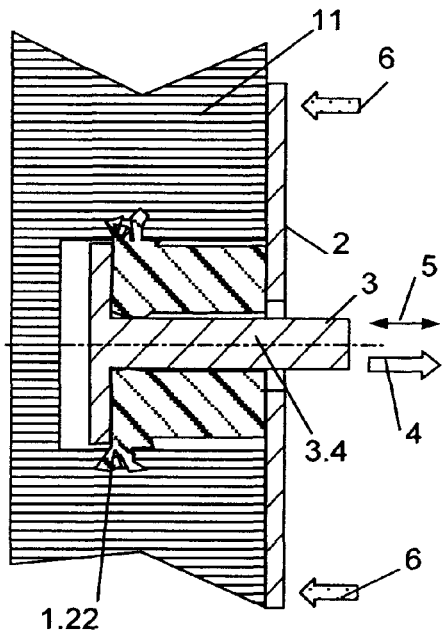

Due to the pulling force, the liquefied thermoplastic material is caused to flow sideways into pores or pre-existing structures of the construction object or to penetrate into inhomogeneities of the construction object material (thereby creating and filled pores in it). This is illustrated in FIG. 1b. The pressure by which the liquefied material portions are pressed into pre-existing pores or inhomogeneities may be influenced by the tool shape. For example, if the rear broadening 3.2 is such as to cover the full width of the bore, liquid material may not flow rearward, so that the pressure may be higher than if liquid material could evade to the rear side.

The portions 1.22 of the liquefied material pressed into the pores after re-solidification define a form-fit connection that due to its deep anchoring in the construction object is sound also if the construction object material is comparably soft or brittle and/or has substantial inhomogeneities.

In the shown configuration, the tool 3 after the anchoring process cannot be removed any more. The tool, however, may serve as functional part of the anchoring element, and for example be used for affixing a further element to it. It may for example comprise a threading (not shown) or other structure enabling such connection, or the other element may be glued or soldered or welded etc. to it. The rear broadening of the tool may moreover, as an alternative to the above-mentioned embodiment, be such that it does not have the full width of the bore, so that some liquefied material may also flow behind the broadening so that, after anchoring, there is a form-fit connection between the tool 3 and the anchoring element 1, too.

In an alternative version, the bore may be a through hole, and the tool may be removed towards the rear side. Possibilities of having the tool removed from the fore side are illustrated further below.

Figure 2:
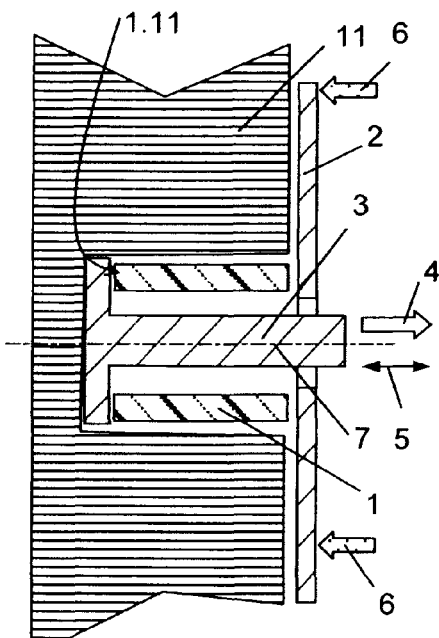
FIG. 2 shows a variant of the device of FIGS. 1a and 1b.

The embodiment of FIG. 2 is distinct from the one of FIGS. 1a and 1b in that the sleeve-like anchoring element 1 is comparably thin-walled and does not have any energy directors.

Figure 3:
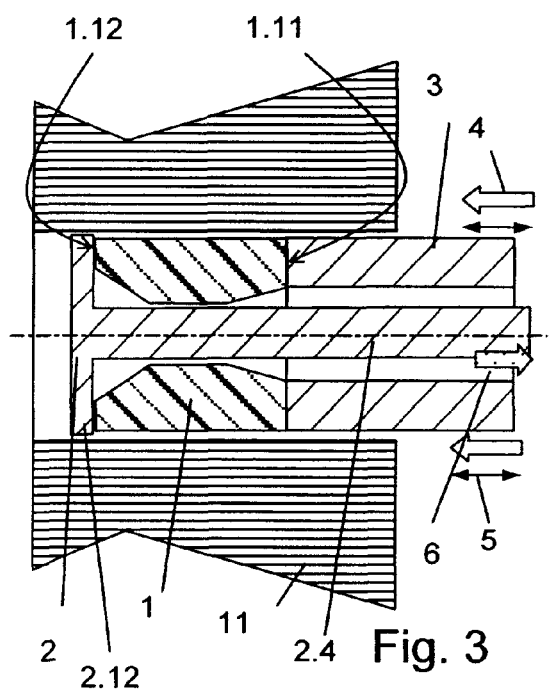
FIG. 3 depicts an alternative principle of a method and device according to the invention.

FIG. 3 shows the anchoring element in a through hole. The shown configuration is also distinct from the configurations of FIGS. 1a and 2 in that the tool 3 (sonotrode) is not pulled during the anchoring process but pushed. In the depicted version, the sonotrode is tube shaped. The counter element on the other hand has a shaft 2.4 reaching through the anchoring element and further has a rear broadening for being pressed against the second coupling face 1.12 of the anchoring element. The counter element may remain in place after anchoring, or it may be removed from the rear side if such removal is possible.

An other feature of special embodiments of the invention is also illustrated in FIG. 3. Depending on the shape of the anchoring element, the anchoring element 1 may be caused to start melting at the interface to the counter element 2, too, or even only at that interface (and not at the interface to the sonotrode). In FIG. 3, the anchoring element comprises a first taper towards the sonotrode, and a second, more prominent taper towards the counter element. Depending on taper (or its absence), the chosen modulus of elasticity of the thermoplastic material and on the wavelength of the mechanical vibrations in the anchoring element 1, the thermoplastic material may be caused to start liquefying at the interface to the sonotrode or to the counter element or even both. In the configuration illustrated in FIG. 3, the thermoplastic material may start being liquefied at both interfaces. Such configurations (both, of the "foreward" and of the "rearward" type) may be used to assure a controlled two-position anchoring. This can be the case within a single opening in the construction object in order to enhance stability. As an alternative, this could even be the case in two different construction objects (thus the rear side anchoring position is in one object, and the fore side anchoring position in the other object, this anchoring securing the two objects against each other).

A special advantage of the approach according to the invention, however, is that it is especially suited for the case where the anchoring element starts melting at the interface to the sonotrode (or other vibrating element). Therefore, in all figures (except in FIG. 3 and where explicitly mentioned to be otherwise) the situation is illustrated where the liquefying (initially) takes place at the interface to the vibrating element. The skilled person will, however, recognize that based on the teaching of FIG. 3 it would also be possible to modify the configuration of other figures to enable initial melting at other places, too.

Figure 4:
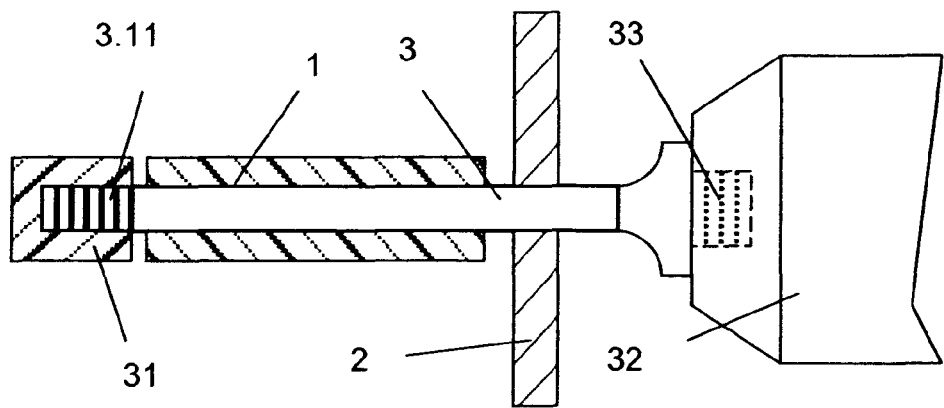
FIG. 4 illustrates an assembly, including a device according to the invention, to carry out an embodiment of the method according to the invention.

FIG. 4 illustrates the principle of a base element 31 that is used for applying the vibrations and that allows removal of the sonotrode after anchoring of the anchoring element. The base element is coupled to the sonotrode 3 before anchoring. This can be done for example by a threading of the sonotrode 3 and the base element 31 or by the sonotrode having appropriate structures (such as ribs/grooves 3.11, as illustrated in FIG. 4, a surface roughness, etc.), and causing thermoplastic material of the base element, in an assembly step, to be locally liquefied and to flow into these structures.

More in general, the assembly of the elements needed for the anchoring process includes the steps of:
- Soundly coupling the sonotrode 3 to the vibration generating device 32. The corresponding coupling means 33 is schematically illustrated in FIG. 4;
- Pushing the counter element 2 and the sleeve like anchoring element 1 onto the sonotrode 3; and
- Coupling the base 31 element to the rear end (tip) of the sonotrode 3. If this is done by local or full melting of base element 31 material, the base element 31 (or base element material) may, during this, be held by an appropriate device. Such device may even be formed as a mold for the base element, so that the base element need not be pre-fabricated but can be manufactured by casting liquid thermoplastic material into the mold. As an alternative thereto, the base element may be pre-fabricated, and the sonotrode may be pressed into while it vibrates.

Thereafter (if necessary after cooling of the base element), the assembly may be placed in an appropriate pre-fabricated opening in the construction object. This opening (bore) is made with a slightly larger diameter than the outer diameter of the base element and the anchoring element. The opening may be a through opening or a blind hole and in the latter case may be slightly deeper than the length of the anchoring element.

Then, the sonotrode with base element and anchoring element is inserted into the opening and brought into the desired position.

The anchoring process itself is illustrated in FIGS. 5*a* through 5*e*. FIG. 5*a* illustrates the step of inserting the sonotrode with the anchoring element and the base element in the opening. When the anchoring element has reached its position (FIG. 5*b*), the counter element is pressed against the front surface 11.1 of the object (arrow 6), and the mechanical vibrations start (arrow 5). Then, while the mechanical vibrations and the counterforce continue to be active, the sonotrode is retracted by a pulling force, causing the material liquefied by the joint action of the pulling force and the mechanical vibrations to penetrate lateral walls of the bore of the construction object (FIG. 5*c*). In this process, the thermoplastic material surrounding the sonotrode is also softened, and after a certain time, the sonotrode may be retracted as illustrated in FIG. 5*d*. After retraction of the sonotrode 3 and removal of the counter element 2, the anchoring element and the base element together remain anchored in the object 11. Since the thermoplastic material has melted at the interface, the anchoring element 1 and the base element 31 will be welded together, together forming, after re-solidification, an anchor 41 that may for example serve as a dowel for affixing a further object (FIG. 5*e*).

This "dowel" utilization—also anchors made by other embodiments of the method according to the invention may be used as dowels—is especially suited for affixing screws to weak or locally weak construction objects, such as objects of porous concrete (as illustrated) or other weak, soft or brittle materials.

Figure 6A:
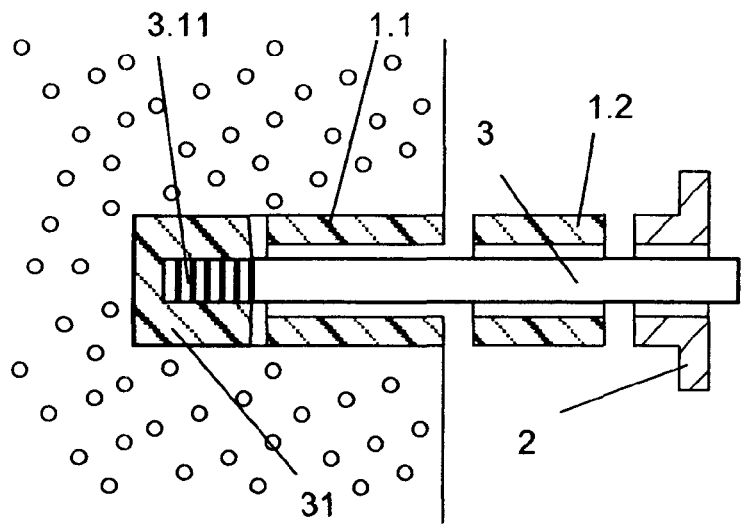
FIGS. 6a and 6b illustrate yet a further embodiment of a method and device according to the invention.
Figure 6B:
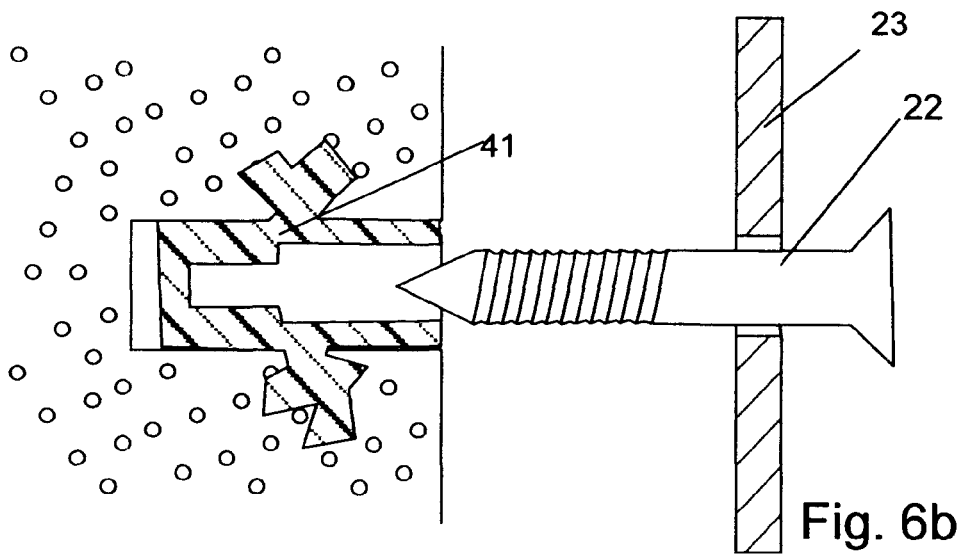

In FIG. 6*a* and FIG. 6*b*, additional principles are shown. These principles need not be combined as shown in the figures, but can rather also be applied separately, and, where compatible, in combination with principles referred to in other figures, such as in combination with the sonotrode arrangements of FIGS. 1-3:
- The anchoring element comprises two initially separate anchoring element parts 1.1, 1.2 that may be both of the same thermoplastic materials or may be made of different materials. For example, the second anchoring element part 1.2—the one that is not in direct contact with the vibrating element—may be made of a thermoplastic material with a higher glass transition temperature than the first anchoring element part 1.1 or of a not thermoplastic material. During the anchoring process, the first anchoring element part 1.1 melts, starting from the first contact face 1.11 (the contact face to the vibrating element) to an extent that also thermoplastic material in contact with the second anchoring element part 1.2 is melted and the anchoring element parts are welded together.
- The counter element is not disk-like or plate like with a central through opening, as shown in the previous figures, but comprises a flange like collar capable of protruding into the opening and thus making possible that the anchoring element is not flush with the object front surface but countersunk. Other shapes of the counter element—defining diverse anchoring element positions, including positions where the anchoring element protrudes from the construction object front surface—are possible.

In the shown configuration, the thermoplastic base element of the anchoring element, as described referring to FIGS. 4 and 5*a*-5*e* is during the anchoring process, also welded to the anchoring element and thus may be viewed as a further part (a third part in the illustrated embodiment) of the anchor 41.

The anchor, after removal of the sonotrode 3, serves as a dowel for a screw 22 that may be screwed into the thermoplastic material after the re-solidification step. The screw may for example be used to affix a further element 23—illustrated only very schematically in the Figure—to the object 11.

Further variations may include
- The second element (counter element) 2 need not be made of a metal, but may be made of a plastics, for example of a thermoplastic material the glass transition temperature is well above the glass transition temperature of the anchoring element 1 itself, or of a thermosetting material;
- Between the second element and the place where the person or apparatus applies the counter force, a further element may be arranged. In fact, any number of number of elements (including washers, sleeves, sockets etc.) may be present.
- The anchoring element or its foremost (closest to the user or apparatus carrying out the method) anchoring element part may comprise an anchoring element head for directly affixing a further element to the construction object—instead of or in addition to the "dowel" function.
- Expansion of the liquefied thermoplastic material into a cavity, for example of a brick, such as a vertically perforated brick, or a cavity behind a panel like or plank like construction object.

The embodiments described referring to FIGS. 1-2 and 4-6 are all based on the—in many cases advantageous—principle according to which the vibrations are coupled into the anchoring element from the rear side and the necessary force is coupled into the sonotrode as a tensile force (pulling force). Even in applications of this principle, it is possible to choose whether the sonotrode or the counter element or both move to compress the anchoring element that is being partly liquefied. This is illustrated in FIGS. 7*a*, 7*b*, 8*a*, and 8*b*.

Figure 7A:
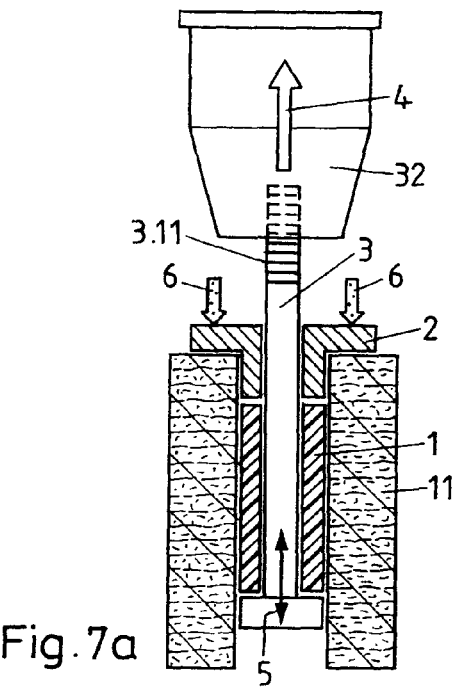
FIGS. 7a and 7b illustrate an even further embodiment of a method and device according to the invention.
Figure 7B:
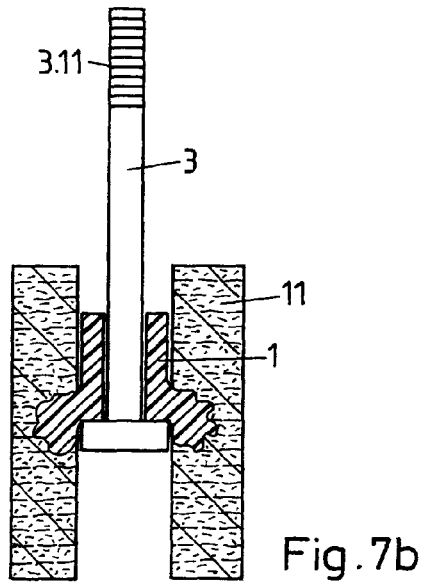

FIG. 7*a* shows the arrangement—for illustration purposes, the construction object is shown to have a through opening (the considerations referring to this Figure also apply to blind holes), and the sonotrode is illustrated to be of the type remaining in place after anchoring and being part of the anchor—at the onset of the anchoring process. Similar to the process described referring to FIGS. 5a through 5e, the anchoring process features a pulling motion of the sonotrode 3. In the figures, also structures 3.11 of the sonotrode for affixing the same to the vibration generating device—are shown. FIG. 7b illustrates the anchor—being made up of the anchoring element 1 and of the sonotrode 3 remaining in place—after anchoring. As illustrated, in this embodiment, the front surface 1.12 of the anchoring element remains unaffected by the anchoring process.

Figure 8A:
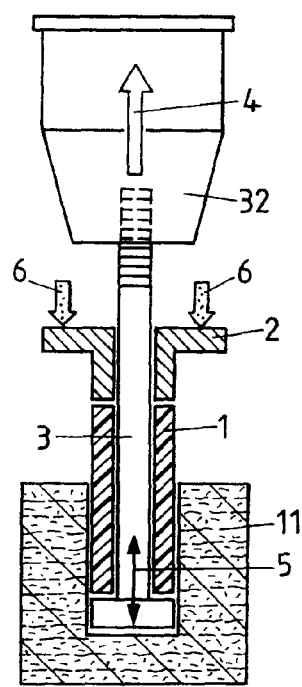
FIGS. 8a and 8b show yet another embodiment of a method and device according to the invention.
Figure 8B:
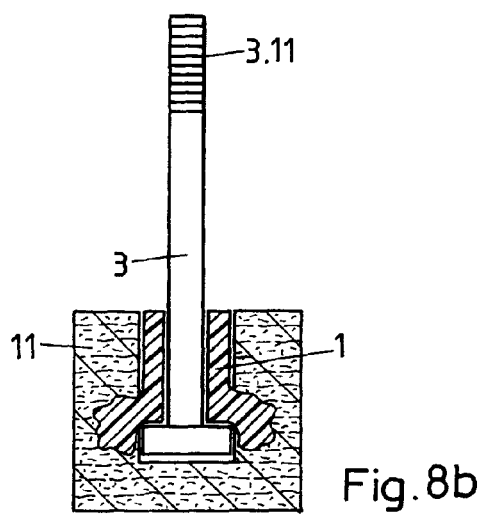

An other basic possibility is shown in FIGS. 8a and 8b illustrating an anchoring arrangement at the onset of the anchoring process and the anchor after the anchoring process. In the illustrated example, the opening is a blind hole, but the same process also applies to through openings. During the anchoring process, the pulling force 4 acting on the anchoring element 1 serves to hold the anchoring element still, whereas the counter element 2 is pushed towards the rear end of the anchoring element. The mechanism is basically the same as the one illustrated in FIGS. 7a, 7b, but the "pushing the counter element" variant is especially suitable for blind holes of limited depth.

A further advantage of the approach according to the invention is—as mentioned above—the suitability for automated anchoring, for example in a manufacturing line of furniture or pre-fabricated building elements or other objects, or also by a handheld device. An according method features the step of automatically applying the force on the sonotrode and on the counter element (or rather, between the sonotrode or an item connected thereto and the counter element). For example, a spring element may be present between the sonotrode and the counter element. The according method is illustrated in FIGS. 9a through 9e. While in the illustration, the arrangement is of the kind described referring to FIGS. 4 and 5a-5e, the described principle also applies to other arrangements, for example with a sonotrode as shown in FIG. 1 with a rear broadening 3.2.

FIG. 9a illustrates the step of inserting the sonotrode with the anchoring element and the base element in the opening. In addition to the elements described referring to FIG. 5a, the arrangement further comprises a spring element 34 under tension between the sonotrode (or more precisely, a casing or the like that is connected to the sonotrode but vibratory decoupled from it such as the vibration generating device's 32 casing or, as in the drawing, a frame 33 or other object attached to it) and the counter element 2. After the positioning of the assembly, the spring force may be released. As illustrated by the double arrows 35 shown in FIG. 9b, both the force onto the sonotrode 3 and the counter force onto the counter element 2 may then be exerted by the spring element. Since during the anchoring process, the vibration generating device 32 has an at least approximately unchanged position, the spring force will cause the counter element 2 to move forward during anchoring, as illustrated in FIG. 9c. Since the liquefaction primarily takes place at and around the interface between the base element 31 and the anchoring element 1, there will not be any liquidized thermoplastic material at the interface between the anchoring element 1 and the counter element 2, and the counter element may—as in the previous embodiments—be removed together with the sonotrode (FIG. 9d) after anchoring. FIG. 9e shows the anchor after the process.

In the illustrated configuration, the spring element is shown to abut a separate, sleeve or ring shaped counter element 2. This is not necessarily the case. Rather, a (for example ring shaped) abutment face of the spring element itself may serve as the counter element instead. Instead of a spring element—that has been pictured in the Figures for illustration purposes—in a load frame also other mechanisms for applying a force may be used such as a hydraulic element, a pneumatic element etc.

The method according to the invention is especially suited for affixing an anchor to a weak or brittle porous material. It is moreover suited for anchoring in objects with no or only very weak material behind a thin, hard wall. Such objects may for example be hollow walls or hollow core boards etc.

Figure 10A:
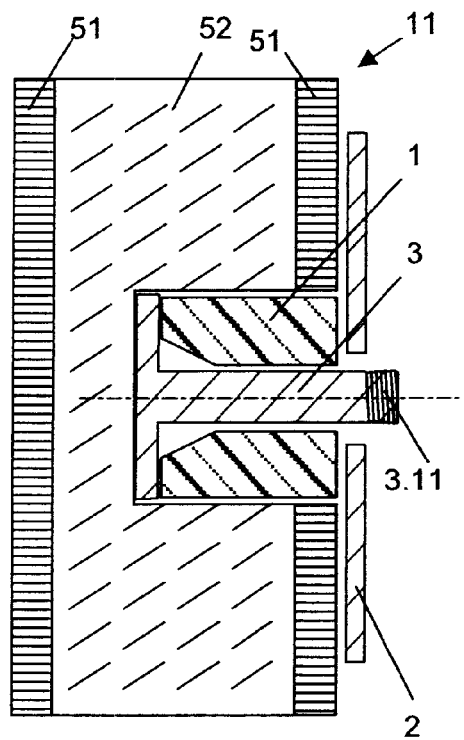
FIGS. 10a and 10b show an embodiment of a method and device according to the invention applied for anchoring in a hollow core board.
Figure 10B:
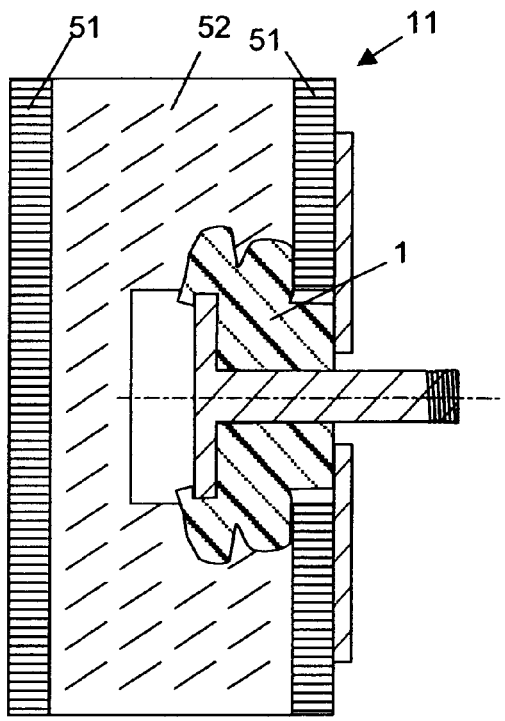

FIGS. 10a and 10b show the anchoring in a construction object 11, where the construction object is a hollow core board 11. In the shown embodiment, the hollow core board comprises two comparably thin and hard panels 51 and a soft filling material 52 therebetween. The filling material may for example be a core or isolation material such as polystyrene foam or glass wool etc.

The anchoring takes place by a process as for example described referring to FIGS. 1 and 2 (with or without automatically applying the force as illusrated in FIG. 9). The anchoring, especially the securing against pulling forces, is takes place irrespective of properties of the filling material and even works if no filling material is present at all. If, however, the filling material 52 has some stiffness and porosity, the anchoring is even more effective than for a completely hollow filling space.

Figure 11A:
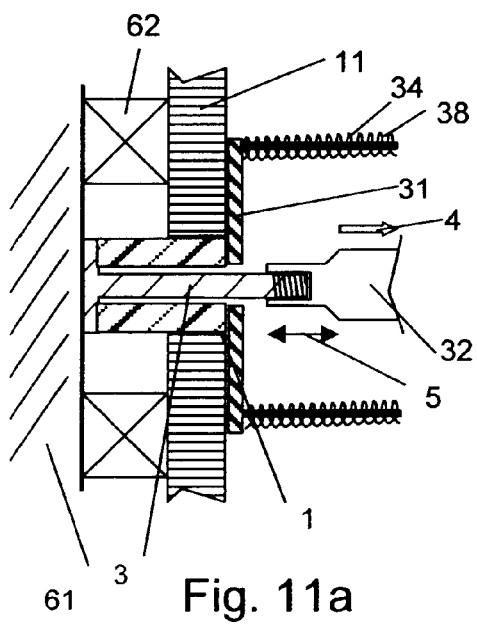
FIGS. 11a and 11b depict an embodiment of a method and device according to the invention applied for anchoring at a hollow wall.
Figure 11B:
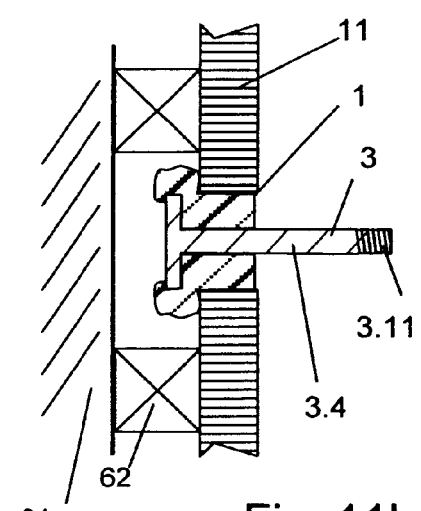

The anchoring in a hollow wall is illustrated in FIGS. 11a and 11b. The object 11 is a plank (or a wall made of a plurality of planks or other flat objects) attached, by means of distance holders, in front of a wall 61 that may be made of very hard material such as hard concrete. The anchoring method may be any one of the above-described methods. The liquefied thermoplastic material expands into the cavity behind the planks—as illustrated in FIG. 11b—and reliably secures the anchor (that comprises the anchoring element 1 as well as the sonotrode 3), especially against pulling forces.

FIGS. 11a and 11b are also a further illustration of excerting the force between the sonotrode and the counter element by means of a spring element, here comprising two springs guided by appropriate guiding means 38. In this example, in contrast to the example of FIG. 9, the spring causes the sonotrode 3 to retract while the counter element 2 rests against the front surface of the construction object. If the method illustrated in FIGS. 11a and 11b is carried out by a hand held tool, the tool may comprise an outer casing in which the vibration generating device 32 is translationally movable, so that the outer casing held by the user keeps its position during the process, whereas the vibration generating device retracts inside the outer casing. The outer casing may for example be connected to the counter element 2.

Figure 12A:
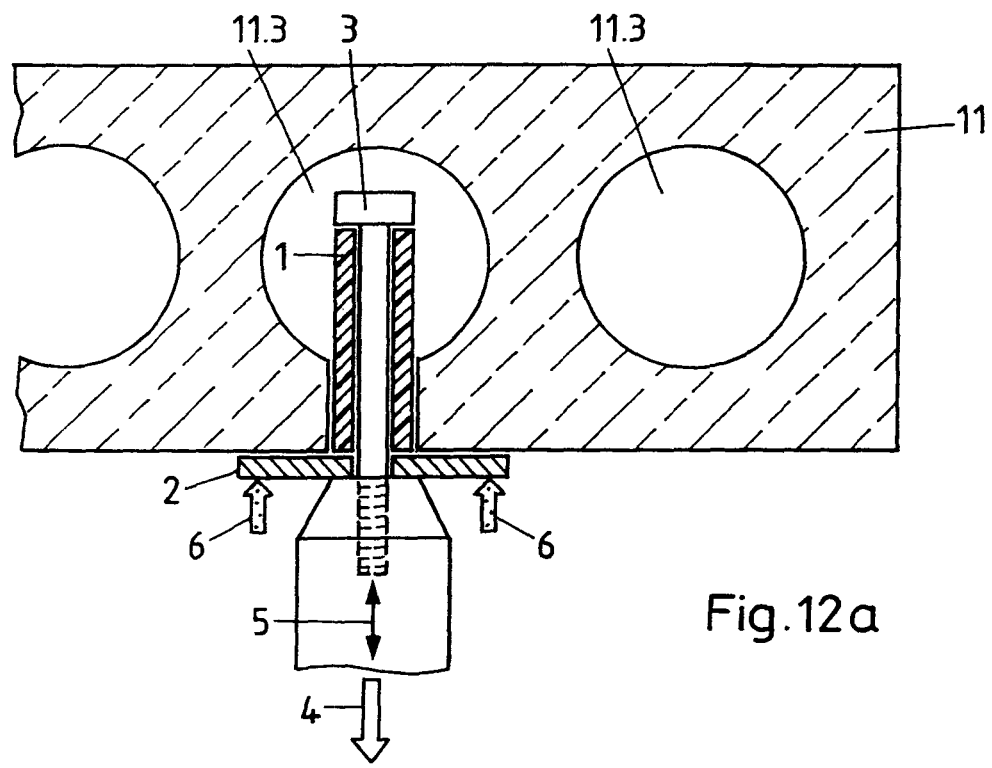
FIGS. 12a and 12b show an embodiment of a method and device according to the invention applied for anchoring in vertically perforated brick.
Figure 12B:
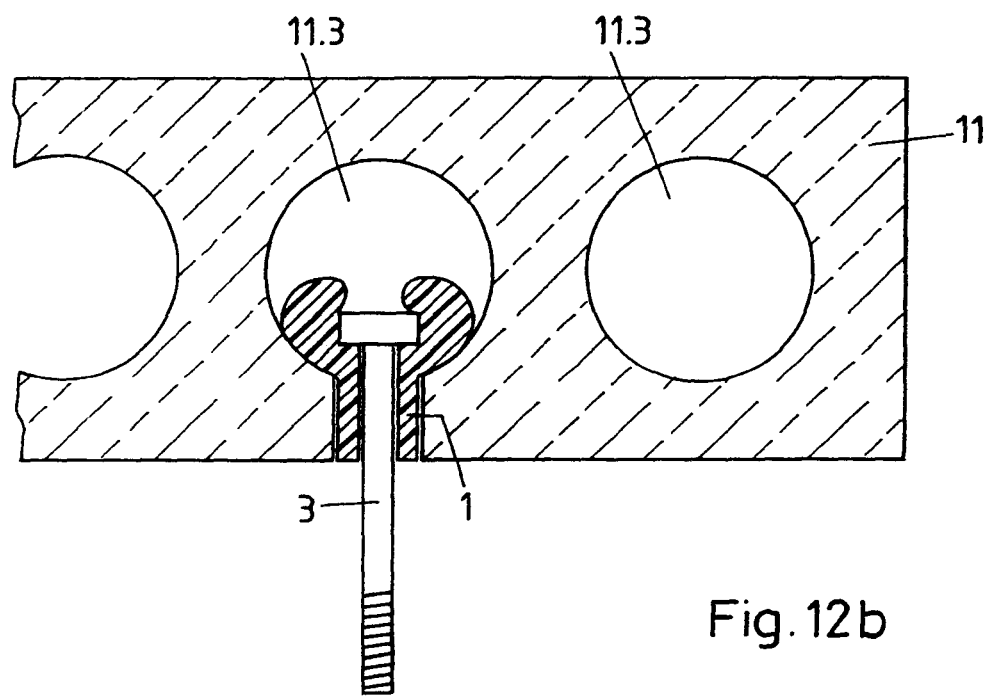

FIGS. 12a and 12b illustrate the anchoring in a vertically perforated brick 11, where expansion of the liquefied polymer material (FIG. 12b) takes place into the cavities 11.3 of the brick. The bore in this case is rectangular or at an angle to the vertical perforation and opens out to the vertical perforation.

All of the above described embodiments except the one of FIG. 3 are based on the—in many cases advantageous—principle according to which the vibrations are coupled into the anchoring element from the rear side and the necessary force is coupled into the sonotrode as pulling force—the "backward" anchoring. In these embodiments, a shaft 3.4 of the sonotrode in some way has to reach through the anchoring element. The so far described, preferred embodiment is to form the anchoring element in a tube or sleeve shape and have the shaft of the sonotrode reach through its central opening. The outer diameter of the sonotrode shaft 3.4 is always smaller than the inner diameter of the anchoring element 1. This—preferred—configuration is illustrated in FIG. 13a, which shows a section through the sonotrode shaft and anchoring element. However, such a symmetrical configuration is not a necessity. Rather, also other configurations, such as the eccentric set-up shown in FIG. 13b or other configurations (with or without circular symmetry of the outer contour) are possible. FIG. 13c shows yet a configuration where the anchoring element comprises two separate anchoring element pieces 1.1, 1.2 arranged at different sides of the sonotrode 3. This makes a T-bar-shaped sonotrode shaft possible, which is advantageous in view of the mechanical stability. The place where the counter element 2 would be located is also illustrated in the FIG. 13c.

Figure 16:
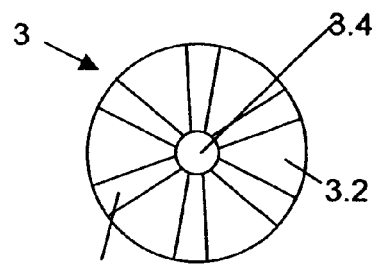
FIGS. 16 and 17 show top views of sonotrodes according to variants of several embodiments of the invention.
Figure 17:
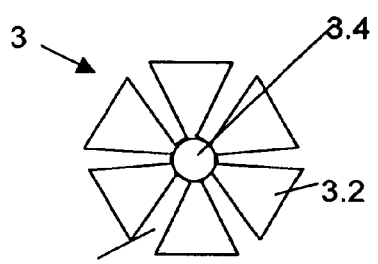
Figure 18:
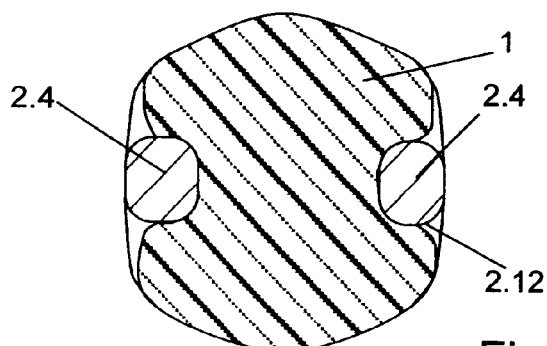
FIG. 18 illustrates, in sectional view, an other arrangement of an anchoring element and a counter element for "forward" anchoring.

In FIGS. 13a-13c—as well as FIGS. 16-18, the axis 7 would be perpendicular to the drawing plane.

In embodiments based on the "backward anchoring" principle, the force 4 to be coupled into the anchoring element acts a tensile force on the sonotrode 3. This requires an appropriate coupling means on the vibration generating device, which does not only need to be suitable for tensile loading but also for the transmission of mechanical vibrations while under tensile loading. Such coupling means are known to one skilled in the art. They are often based on a form fit (screw joints, snap fastenings, bayonet catches, etc.) or possibly a material fit (glued, welded or soldered connections) or a friction fit (clamped connections). Such generally known coupling means are not further discussed here. The principle of a form-fit coupling means is shown in FIG. 14. This coupling can be used as shown or in an alternative form. The vibration generating device comprises an extension protruding into a clearance at the proximal end of the tool 3 and widening towards its distal end so that it can transmit a tensile force. For coupling the tool 3 to the vibration generating device, these are moved perpendicular to the plane of FIG. 14 relative to each other. Dovetails or similar modifications may be considered.

In embodiments where the sonotrode remains in place and forms a part of the anchor after anchoring, the same coupling means may also be used to couple a further element to the anchor (of course, in these embodiments an essentially irreversible coupling of the sonotrode to the vibration generating device—such as gluing, welding soldering or the like—is not well suited)

Figure 15:
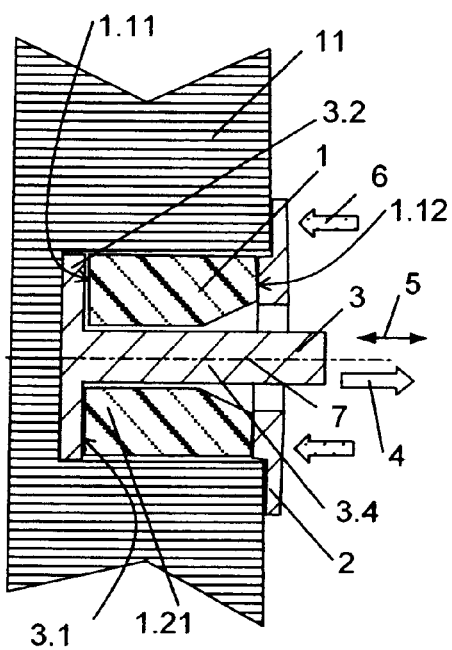
FIG. 15 illustrate yet another embodiment of a method and device according to the invention.

FIG. 15 shows a further embodiment of a method and device according to the invention. This embodiment is based on the concept illustrated referring to FIGS. 1 and 2, but with the substantial difference that the anchoring element is configured so that the liquefaction of the thermoplastic material starts at the interface between the anchoring element 1 and the counter element 2 and not at the interface between the acnhoring element 1 and the sonotrode 3, as in the embodiments of FIGS. 1 and 2. To this end, the anchoring element comprises energy directors in contact with the interface to the counter element. In the illustrated embodiment, the energy directors are constituted by a taper towards the fore side of the anchoring element. The counter element slightly protrudes into the opening of the construction object so that the thermplastic material that flows sidewards after liquefaction does not ooze out of the opening but protrudes into the pores/structures of the construction material.

This embodiment is especially suited for situations where anchoring at a pre-defined position in the opening and/or close to the front side of the construction object 11 is desired.

FIG. 16 and show variants of sonotrode properties that may be used for arrangements/methods of the "rearward" type in accordance with the present teaching. The sonotrode of FIG. 16 comprises a plurality of liquid guiding channels 3.21 that are for example provided as grooves in the forward facing surface of the rear broadening (FIG. 16 shows a view onto this surface facing towards the user/apparatus applying the method). The material of the anchoring element will liquefy in contact with the foremost surface of the rear broadening 3.2 and then can evade into the channels and from there towards the lateral sides. This embodiment, among other things, is suitable to concentrate the liquefied material to certain azimuth angles.

In the embodiment of FIG. 17, the rear broadening comprises openings or interruptions 3.22 allowing the liquefied material to pass through. Due to this concept, rather than causing the anchoring element to become ever shorter during the anchoring process by being confined between the sonotrode rear broadening and the counter element, the sonotrode is partly moved through anchorig element material, leaving a cushion of such material on the rear side of the sonotrode. This embodiment is especially suited for situations, where the anchoring is to bear axial, rearward facing loads as well, as the cushion can absorb such forces, especially if it fills the space between the rear broadening and the base of the opening in the construction object.

Instead of the illustrated interruptions directed radially outward, other kinds of openings/interruptions may be present. For example, the rear broadening may comprise a plurality of holes of same or different sizes. As an example, such openings may be arranged in radially directed rays and comprise sizes that increase with increasing distance from the shaft 3.4.

Further examples of "forward" type devices and methods are described referring to FIGS. 18-21.

FIG. 18 shows a sectional view of an arrangement of an anchoring element 1 and a counter element 2. In contrast to the embodiment illustrated in FIG. 3, the portion of the counter element reaching trough the anchoring element 1 is arranged at the periphery of the anchoring element. In the illustrated configuration, it comprises two rods 2.4 guided sideways along the length of the anchoring element. This configuration—and other configurations with counter elements hold from the outer circumference rather than from the core of the anchoring element—may have advantages in handling the counter element and the sonotrode/vibration generating device, compared to the embodiment of FIG. 3.

Figure 19A:
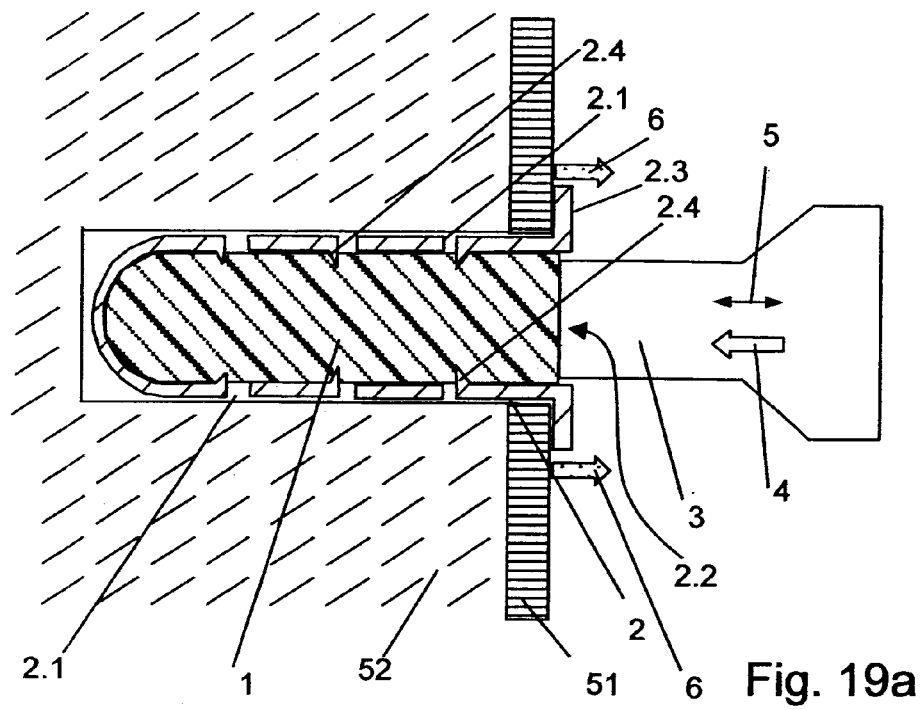
FIGS. 19a and 19b depict an embodiment of a method and device according to the invention.
Figure 19B:
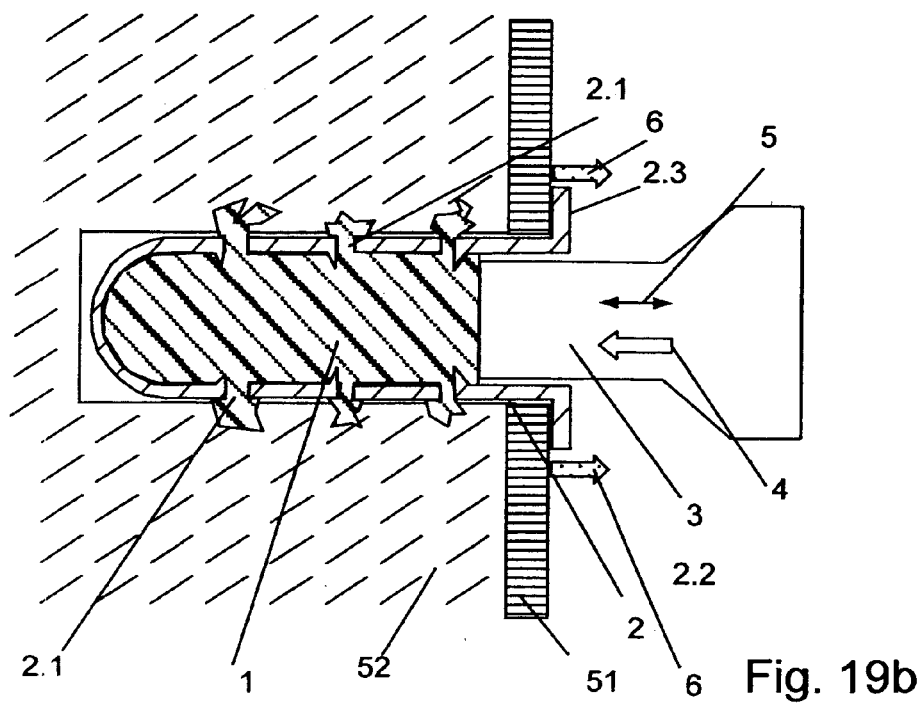

FIGS. 19a and 19b show a first example of a device and method, where the counter element 2 is formed as a receptacle such as a sleeve. FIG. 19a shows the arrangement at the onset of the anchoring process, whereas FIG. 19b shows the arrangement towards the end of the anchoring process.

The receptacle comprises a single outward facing mouth 2.2 and a plurality of openings 2.1 in the lateral surface (on the side) and possibly also in the inward facing surface (not shown). The anchoring element 1 may, prior to the anchoring process, be present in the receptacle and for example be fix in it. As an alternative, the anchoring element may initially be separated from the receptacle and inserted in it prior to anchoring.

In the anchoring process, the sonotrode 3 presses against the anchoring element from the front side while it vibrates (mechanical vibrations 5). The counter element comprises a flange 2.3 that rests on the outer surface of the construction object in vicinity to the opening and thus causes the counter force 6 to be created as a normal force acting on the flange 2.3. Due to the effect of the mechanical vibrations and the pressing force applied to the anchoring element, the anchoring element starts melting and thereafter is pressed through the openings 2.1 into pores of the surrounding material 52 that may be substantially less mechanically stable than the front panel 51 that creates the normal force (FIG. 19b). In order for the thermoplastic material to start melting in vicinity of pores, either the receptacle 2 or the anchoring element 1 or both comprise according energy directing structures such as narrowings, edges, tips etc. In the depicted configuration, the anchoring element comprises inward facing protrusions 2.4 in vicinity to the openings 2.1.

The embodiment of FIGS. 19a and 19b may for example also be used in connection with an anchoring element material that is softer than anchoring element materials of other embodiments, so that the heat for melting the material may also, predominantly or in a substantial proportion, be created by internal friction instead of predominantly by absorption of mechanical energy at interfaces.

The sleeve like receptacle anchored in the for example relatively soft and/or brittle material may for example be used as a dowel. It may even comprise pre-fabricated structures—such as a threading—to affix a further element, such as a screw, to it. Such a further element can bear upon the sleeve itself and/or remaining thermoplastic material inside the sleeve.

In addition or as an alternative, the flange 2.3 may be used—like a head of a screw—to affix an other element—placed before anchoring—to the front surface.

In the shown configuration, the counter force is created, by means of a flange, as a normal force. However, the sleeve like counter element 2 could equally well be held by other means—for example actively by the user/apparatus carrying out the method.

Even though in the shown configuration the counter force is created as normal force and thus ultimately the force necessary for anchoring rests on the object, there is a substantial advantage over the prior art method for example described in WO 98/00109: The surface comprising the structures/pores and/or cavities into which the liquefied thermoplastic material ultimately penetrates itself is not mechanically loaded. The place at which the normal force is created—the front panel in the shown configuration—is not identical with the place in which the anchoring element ultimately is anchored. This advantage is useful in configurations where there is not enough mechanically strong material in the construction object but the anchoring element has to be anchored in mechanically less stable material—such as the illustrated construction object comprising a thin, hard panel, and softer material underneath, i.e. a sandwich or isolation material.

Figure 20A:
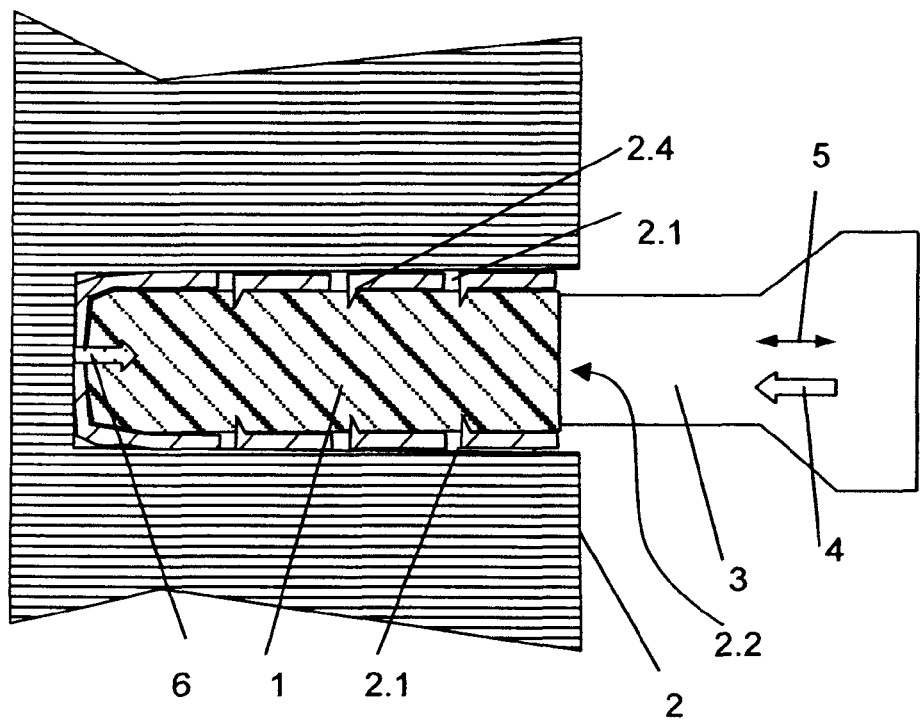
FIGS. 20a and 20b show a further embodiment of a method and device according to the invention.
Figure 20B:
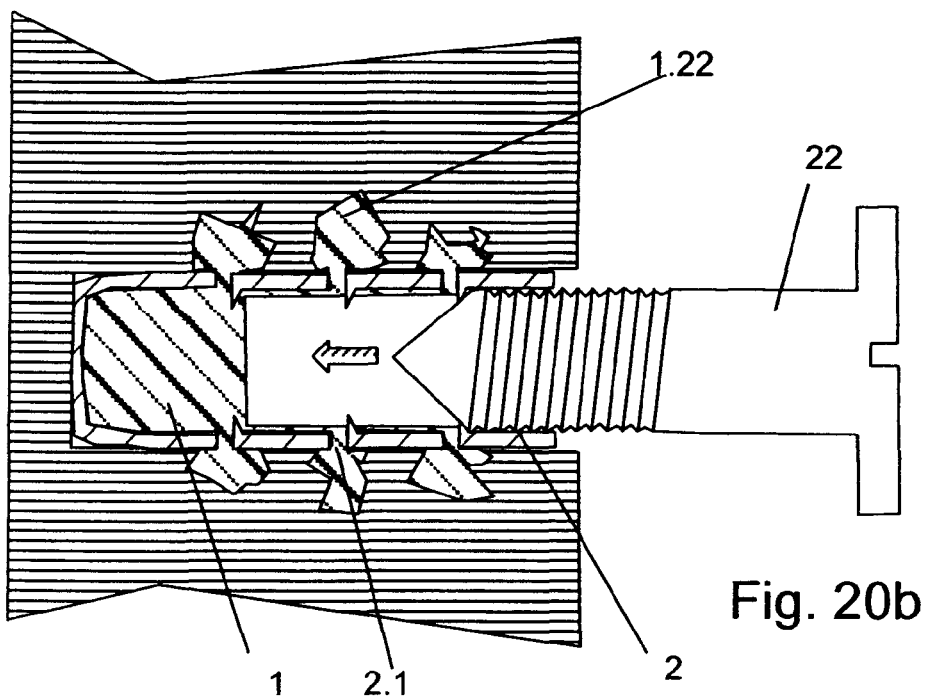

FIGS. 20a and 20b show yet an other embodiment of a device/method where the counter element is formed as a sleeve like receptacle. In this embodiment, however, the counter force 6 is created by the normal force at the base of the blind bore in the construction element 11, i.e. by the counter element being pressed against the base of the blind hole. This embodiment is suitable for construction objects that are comparably stiff and mechanically stable, such as construction objects of wood or wood composites or (porous) concrete or dense metal foams etc.

The embodiment of FIGS. 20a and 20b is among other things, especially suited for forming a dowel for a further element 22, where the connection to the further element has to bear heavy loads and/or loads for a long time. State of the art dowels based on polymer materials feature the problem that polymer material flows over a long time. This problem is significantly reduced due to the effect of the—for example metallic—sleeve 2, to which the further element may be affixed. For example, as illustrated in FIG. 20b showing the anchoring element after the anchoring process, the sonotrode may be chosen to displace substantially all polymer material over a substantial portion of the depth of the sleeve, so that the further element 22—illustrated is a screw—is directly secured to the sleeve 2.

Figure 21:
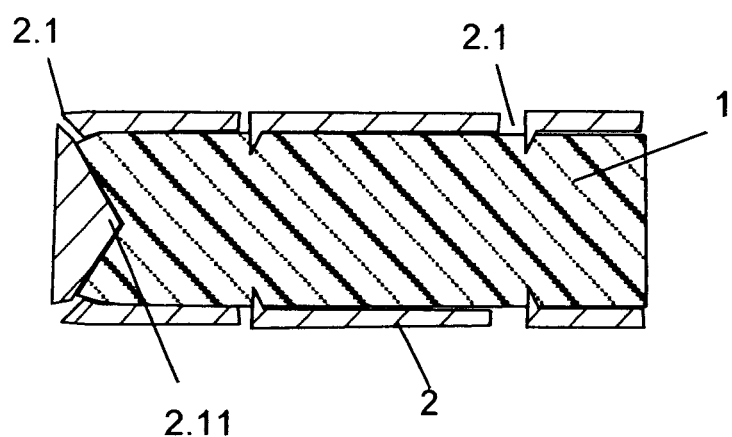
FIG. 21 shows a variant of an arrangement for different embodiments of the invention.

The variant of a device illustrated in FIG. 21 is distinct from the previously shown embodiments in that it comprises openings 2.1 also (or only) at the base of the sleeve. An energy director assuring melting of the thermoplastic material at the base is formed by a rearwardly facing protrusion 2.11 at the base of the sleeve. This variant could also be provided with a flange feature like the embodiment of FIG. 19a.

Various other embodiments may be envisaged without departing from the scope and spirit of the invention.

What is claimed is:

1. A method of anchoring an element in a construction object, a surface of which object has pores or structures and/or in which surface pores are creatable by a liquid under hydrostatic pressure and/or in which a cavity is defined, the method comprising the steps of
   providing a first element and a second element, the first element comprising a thermoplastic material;
   positioning the first element in a vicinity of said surface and/or of said cavity, respectively, and positioning the second element in contact with the first element;
   causing a third element to vibrate while loading the first element with a force, thereby applying mechanical vibrations to the first element, and simultaneously loading the first element with a counter-force by the second element;
   by the joint application of the mechanical vibrations and the load, liquefying at least some of the thermoplastic material, thereby creating liquefied material;
   causing, by the joint application of the mechanical vibrations and the load from the second and third element, the first element to be compressed and thereby causing the liquefied material to flow into pores and/or structures and/or the cavity;
   letting the liquefied material re-solidify so that the first element is anchored in the object, and
   wherein the force in the third element is a tensile force.

2. The method according to claim 1, comprising the further step of causing the second element to be anchored by the liquefied material of the first element.

3. The method according to claim 2, wherein the step of causing the second element to be anchored by the liquefied material of the first element includes causing the second element to be welded to the first element.

4. The method according to claim 1, comprising the further step of causing the third element to be anchored by the liquefied material of the first element.

5. The method according to claim 4, wherein the step of causing the third element to be anchored by the liquefied material of the first element includes causing the third element to be welded to the first element.

6. The method according to claim 1, wherein the step of causing the liquefied material to flow into pores and/or structures and/or the cavity includes putting the liquefied material, by the joint action of the force and the counter force, under hydrostatic pressure and thereby pressing the liquefied material into the pre-existing pores and/or structures and/or causing the liquefied material under hydrostatic pressure to penetrate into inhomogeneities of the surface and thereby generating the pores, filled by the liquefied material.

7. The method according to claim 1, wherein said force and said counter force are equal in magnitude and directed in opposite directions.

8. The method according to claim 1, wherein the force defines an axis and, along the axis, a fore side, from which the third element is accessible for a user or apparatus carrying out the method, and a rear side opposite thereof, and wherein the first element is loaded by the force by pressing a face of the third element against a rear coupling face of the first element, whereas the first element is loaded by the counter force by means of pressing the second element against a forefront coupling face of the first element.

9. The method according to claim 1, wherein the third element is of one piece and remains in place and anchored in the construction object after anchoring.

10. The method according to claim 1, wherein the third element comprises a shaft of a first material and a base element of a second material different from the first material, and wherein the method includes the step of separating the shaft from the base element while the liquefied material flows and/or after the liquefied material has flown into the pores and/or structures and/or the cavity, the base element remaining in place and anchored in the construction object after anchoring.

11. The method according to claim 1, wherein the first element comprises an axial through hole, and the third element comprises a shaft, and wherein the method includes the step of inserting the shaft through the axial through hole prior to the step of causing the third element to vibrate.

12. The method according to claim 1, wherein the second element is a receptacle formed by a sleeve with a plurality of holes and a receptacle mouth, the first element being placed within the receptacle, a first coupling face for being contacted by the third element being accessible through the receptacle mouth.

13. The method according to claim 12, the second element comprising a flange of the sleeve, formed adjacent the mouth, and wherein the step of applying the counter force includes causing the flange to rest against a front surface of the object.

14. The method according to claim 1, wherein the step of liquefying at least some of the thermoplastic material includes initiating a liquefying process at an interface between the first element and the third element.

15. The method according to claim 1, wherein the force and the counter force are applied so as to keep said surface free of mechanical loading.

16. The method according to claim 1, wherein the force and the counter force are applied by an automated mechanism.

17. The method according to claim 1, wherein the step of liquefying at least some of the thermoplastic material includes liquefying at least some of the thermoplastic material at at least one interface, wherein said at least one interface is at least one of an interface between the first element and the third element, of an interface between the first element and the second element, and of an interface between parts of the first element.

18. The method according to claim 1, wherein material liquefied in said step of liquefying at least some of the thermoplastic material is, prior to being liquefied, not in contact with any surface of the construction object.

19. The method according to claim 16, wherein the automated mechanism is one of a spring mechanism, a hydraulic mechanism, or a pneumatic mechanism.

* * * * *